United States Patent [19]

Takikawa et al.

[11] Patent Number: 5,018,612
[45] Date of Patent: May 28, 1991

[54] TEMPERATURE-CONTROLLED FAN FLUID COUPLING

[75] Inventors: Kazunori Takikawa; Yuichi Ono, both of Numazu, Japan

[73] Assignee: Usui Kokusai Sangyo Kaisha Limited, Japan

[21] Appl. No.: 438,772

[22] Filed: Nov. 17, 1989

[30] Foreign Application Priority Data

Nov. 21, 1988 [JP] Japan ................................ 63-151542

[51] Int. Cl.⁵ .................................................. F16D 31/00
[52] U.S. Cl. ........................................ 192/58 B; 192/82 T
[58] Field of Search ........................ 192/58 B, 82 T; 123/41.12

[56] References Cited

U.S. PATENT DOCUMENTS

| | | | |
|---|---|---|---|
| 2,879,755 | 3/1959 | Weir | 123/41.12 |
| 2,988,188 | 6/1961 | Tauschek | 192/82 T |
| 3,059,745 | 10/1962 | Tauschek | 192/58 B |
| 3,217,849 | 11/1965 | Weir | 192/82 T |
| 3,259,221 | 7/1966 | Godfrey | 192/58 B |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,727,735 | 4/1973 | La Flame | 192/58 B |
| 3,840,101 | 10/1974 | Peter et al. | 192/58 B |
| 3,856,122 | 12/1974 | Leichliter | 192/58 B |
| 3,893,555 | 7/1975 | Elmer | 123/41.12 |
| 3,964,582 | 6/1976 | Mitchell | 192/58 B |
| 4,238,016 | 12/1980 | Yoshida et al. | 192/58 B |
| 4,281,750 | 8/1981 | Clancey | 192/58 B |
| 4,403,684 | 9/1983 | Haeck | 192/58 B |
| 4,505,367 | 3/1985 | Martin | 192/58 B |
| 4,629,046 | 12/1986 | Martin | 192/58 B |
| 4,665,694 | 5/1987 | Brunken | 60/330 |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 123/41.12 |
| 4,846,331 | 7/1989 | Ono | 192/58 B |
| 4,850,465 | 7/1989 | Ono | 192/58 B |

FOREIGN PATENT DOCUMENTS 55-76226  6/1980  Japan .
57-167533 10/1982  Japan .
57-179431 11/1982  Japan .
62-124330  6/1987  Japan .

Primary Examiner—Rodney H. Bonck
Assistant Examiner—Andrea Pitts
Attorney, Agent, or Firm—Anthony J. Casella; Gerald E. Hespos

[57] ABSTRACT

A fan fluid coupling for use with an automotive engine. The coupling comprises a sealed housing, a partition plate that partitions the inside of the housing into an oil reservoir chamber and a torque transmission chamber, a resilient tonguelike valve member, and a rod member. The partition plate is provided with an outflow-adjusting hole located close to the outer end of the partition plate. The hole is a slot extending circumferentially of the partition plate. One end of the valve member is fixed to the partition plate. The valve member is curved upward. The front end of the valve member is in resilient contact with the rod chamber against which a bimetallic strip is pressed.

5 Claims, 2 Drawing Sheets

TEMPERATURE-CONTROLLED FAN FLUID COUPLING

BACKGROUND OF THE INVENTION

1. Field of the Invention

The present invention relates to improvements in a temperature-controlled fan fluid coupling which is generally used with an automotive engine to drive the cooling fan in such a way that cooling air is supplied to the engine always at a flow rate corresponding to the operating conditions of the engine. That is, the invention relates to a fan fluid coupling which automatically controls the flow rate of cooling air supplied to an automotive engine.

2. Description of the Prior Art

A conventional fan coupling of this kind is shown in FIG. 5, where a partition plate 14 is provided with a circular outflow-adjusting hole 14'. The plate contains a resilient valve member 15 in the form of a plate. The valve member interlocks with an interlocking rod which follows deformation of a temperature-sensing device mounted outside. The temperature-sensing device deforms as temperature varies. The valve member 15 has a flat surface at its front end. As temperature varies, the flat surface of the valve member 15 moves forward or rearward to close or open the hole 14'. The characteristic of this fan coupling is indicated by curve (B) in FIG. 6.

In this conventional fan coupling, the outflow-adjusting hole 14' is closed or opened directly by the flat surface at the front end of the valve member 15 which moves forward or rearward. Therefore, the area of the hole 14' when it is fully open is restricted by the width of the valve member 15. For this reason, it is impossible to make the area of the hole large. Further, if a slight rift is created in the valve member, the effective area with which oil passes varies greatly. Consequently, the amount of oil delivered cannot be controlled accurately. As can be seen from the characteristic curve (B), the rotational speed increases rapidly at a temperature of about 60° under normal operating conditions. Hence, the fan coupling is unable to constantly supply adequate amount of cooling air over a wide range of temperatures when the vehicle is running. Thus, noise generated by the fan, consumption of the energy, and the time for which the automotive engine is warmed up cannot be reduced sufficiently. Furthermore, because only the long, integrated valve member 15 is used, the valve member deflects back and forth due to variations of the pressure of oil flowing through the outflow-adjusting hole 14', whereby the fan hunts. In addition, the centrifugal force acting on oil increases the oil pressure to hinder the valve member from closing the outflow-adjusting hole. When the engine is started or accelerated, the rotational speed of the sealed housing increases rapidly to thereby rotate the fan at a high speed, because a means for preventing oil from flowing into the outflow-adjusting hole is not mounted on the upstream side of the adjusting hole as viewed in the direction of rotation.

SUMMARY OF THE INVENTION

In view of the foregoing problems with the prior art techniques, the present invention has been made. It is an object of the invention to provide a temperature-controlled fan fluid coupling which always supplies adequate amount of cooling air according to the operating conditions of an automotive engine, responds well to temperature, controls the fan quickly, smoothly, and accurately, prevents hunting and aforementioned increase in the rotational speed of the fan at the time of start-up or acceleration, and effectively transmits torque.

The above object is achieved in accordance with the teachings of the invention by a temperature-controlled fan fluid coupling comprising: a rotating main shaft; a drive disk rigidly fixed to the front end of the shaft; a sealed driven housing supported on the shaft via a bearing; a fan member mounted on the outer surface of the housing; a partition plate which divides the inside of the housing into an oil reservoir chamber and a torque transmission chamber containing the drive disk, the partition plate being provided with an outflow-adjusting hole for adjusting the outflow of internal fluid; a dam formed in a part of the inner wall surface of the housing which is opposite to the outer wall surface of the drive disk and on which oil collects during rotation; a circulating passage communicating with the dam and extending from the torque transmission chamber to the oil reservoir chamber; a temperature-sensing member that is mounted on the front surface of the housing and deforms with temperature; a valve member which is mounted inside the housing, interlocks with the deforming temperature-sensing member, and operates in such a way that when the ambient temperature exceeds a preset value, the valve member opens the outflow-adjusting hole and that when the ambient temperature is below the preset value, the valve member closes the hole; and a gap formed between the opposite surfaces of the housing and the drive disk mounted in the housing to transmit torque. The effective contact area of oil in the gap is increased and decreased to control the torque transmitted from the driving main shaft to the driven housing. This fan fluid coupling has the following features. The outflow-adjusting hole is located in close proximity to the outer end of the partition plate. This hole takes the form of a slot extending circumferentially of the partition plate. The valve member is close to the hole and extends circumferentially over it. One end of the valve member is rigidly fixed to the inner wall of the oil reservoir chamber. The valve member has resilience, is shaped into a tonguelike form, and curved upward. The front end of the curved valve member is in resilient contact with a rod member or indirectly connected resiliently with the rod member.

In another feature of the invention, the fixed end of the valve member is located on the upstream side of the outflow-adjusting hole as viewed in the direction of rotation. In a further feature of the invention, the front end of the curved valve member is caused to interlock with the rod member via an interlocking member. In a still other feature of the invention, a weight is attached to the interlocking member.

In the above-described novel structure, the outflow-adjusting hole is located in close proximity to the outer end of the partition plate and shaped into a slot extending circumferentially of the plate. Since the hole is not restricted by the width of the valve member, the hole is so shaped as to have a large area. The resilient tonguelike valve member is disposed close to the outflow-adjusting hole and curved upward. The front end of the curved valve member is in resilient contact with the rod member or directly connected resiliently with the rod member. Near the outer end at which the pressure is highest because of the centrifugal force of oil collecting in the oil reservoir chamber, the rod member moves forward or rearward in response to a change in the ambient temperature. At this time, the position, the shape, and the direction of the outflow-adjusting hole permit the valve member to move about its fixed end, so that the hole is continuously and efficiently opened or closed. As indicated by (A) in FIG. 6, the rotational speed is in proportion to the ambient temperature, i.e., good response is obtained. Further, the fan coupling can control the amount of cooling air quickly, smoothly, and accurately. Also, hunting is prevented. In addition, the valve member is not hindered from closing the hole. Near the outer end, oil contains less air bubbles. Because the oil of this kind flows out toward the torque transmission chamber, torque can be transmitted effectively. Since the fixed end of the valve member is located on the upstream side of the outflow-adjusting hole as viewed in the direction of rotation, the valve member prevents oil from flowing into the hole when the rotational speed of the housing increases rapidly upon startup or acceleration of the engine. Consequently, violent increase in the rotational speed of the fan can be prevented. In FIG. 6, T indicates temperature, while F indicates the rotational speed of the output of the fan.

Other objects and features of the invention will appear in the course of the description thereof which follows.

DETAILED DESCRIPTION OF THE PREFERRED EMBODIMENTS

Figure 1:
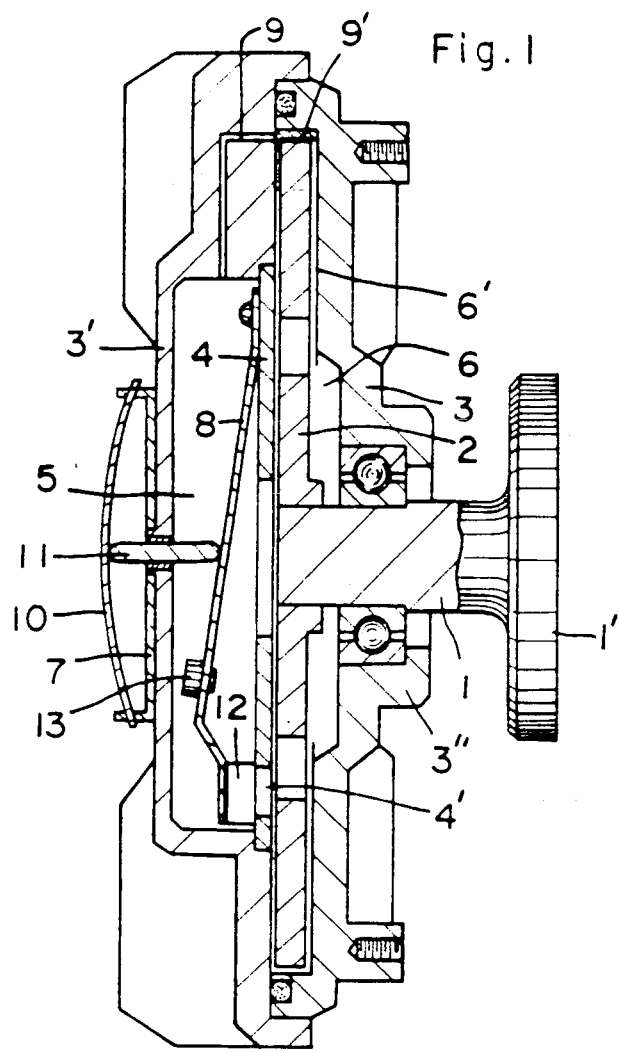
FIG. 1 is a partially cutaway vertical cross section of a temperature-controlled fan fluid coupling according to the invention.
Figure 2:
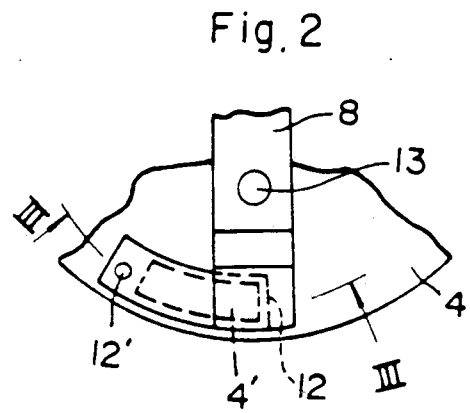
FIG. 2 is a plan view of main portions of the coupling shown in FIG. 1.

Referring to FIGS. 1-4A, there is shown a fan fluid coupling according to the invention. The coupling includes a rotating main shaft 1. A drive disk 2 is rigidly fixed to the front end of the shaft 1. This shaft 1 has a mounting flanged wall 1' at its rear end. A casing 3" is supported on the shaft 1 via a bearing. A cover 3' is mounted on the front surface of the casing 3" to form a sealed housing 3 which is driven. The inside of the housing 3 is partitioned into an oil reservoir chamber 5 and a torque transmission chamber 6 by a partition plate 4. An outflow adjusting hole 4' having a large area is formed in the partition plate 4 in close proximity to the outer end of the plate. The hole 4' assuming the form of a slot extending circumferentially of the plate controls the flow rate of oil flowing from the reservoir chamber 5 to the torque transmission chamber 6. A torque transmission gap 6' is formed between the opposite surfaces of the drive disk 2 and the sealed housing 3 in the torque transmission chamber 6.

An interlocking member 8 is made of a spring material. One end of the interlocking member 8 is riveted to the surface of the partition plate 4 that is on the side of the oil reservoir chamber 5. The other end is located close to the outflow-adjusting hole 4'. A metallic fixture 7 is fixed to the front surface of the cover 3'. A temperature-sensing member 10 consisting of a bimetallic strip has its both ends anchored to the fixture 7. As the ambient temperature varies, the temperature-sensing member 10 deforms, moving an interlocking rod member 11 forward or rearward. This moves the interlocking member 8 forwardly or rearwardly. A dam 9' is formed in a part of the inner wall surface of the casing 3" which is opposite to the outer wall surface of the drive disk 2. Oil collects on this inner wall surface of the casing 3". An oil circulating passage 9 extends to the oil reservoir chamber 5 from the torque transmission chamber 6 which is formed close to the dam 9' on the upstream side of the dam as viewed in the direction of rotation. A short tonguelike, resilient valve member 12 is curved upward near the outflow-adjusting hole 4' and extends circumferentially relative to the partition plate 4 and over the hole 4'. One end of the valve member 12 is firmly fixed to the partition plate 4 or the inner circumferential wall of the cover 3' (FIG. 4A) at 12'. The valve member 12 acts to open and close the hole 4'. The raised front end of the valve member 12 is in resilient contact with the rod member 11 (FIGS. 4 and 4A) or resiliently connected with the rod member 11 via the interlocking member 8 (FIGS. 1, 2, and 3) to permit the valve member 12 to continuously and accurately close the adjusting hole 4'. The fixed end 12' is located on the upstream side of the hole 4' as viewed in the direction of rotation so that the valve member 12 may prevent oil from flowing into the outflow-adjusting hole 4' when the rotational speed of the sealed housing 3 is increased rapidly at the time of start-up or acceleration. Thus, rapid increase in the rotational speed of the fan is prevented.

A weight 13 is attached to the interlocking member 8 so that centrifugal force also acts on the weight 13. If the rotational speed of the sealed housing 3 exceeds a value which has been previously determined for the present temperature, the rotational speed of the sealed housing 3 is reduced to the predetermined value by the action of the weight.

Figure 3:
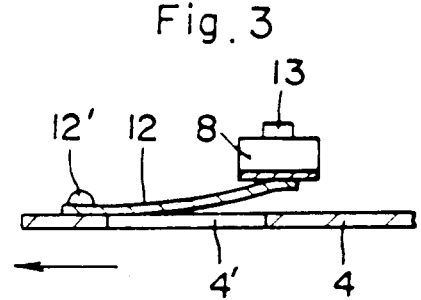
FIG. 3 is a cross-sectional view taken on line 3—3 of FIG. 2.
Figure 5:
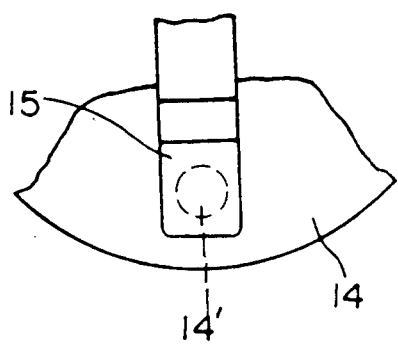
FIG. 5 is a partially cutaway plan view of a conventional fan fluid coupling, showing the vicinities of its outflow-adjusting hole.
Figure 6:
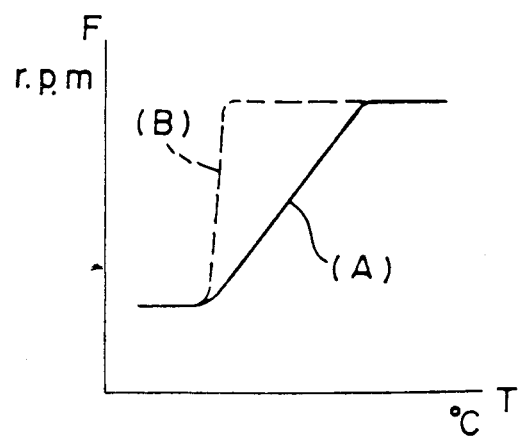
FIG. 6 is a graph showing the characteristic curve of a fan according to the invention and the characteristic curve of the prior art fan.
Figure 4:
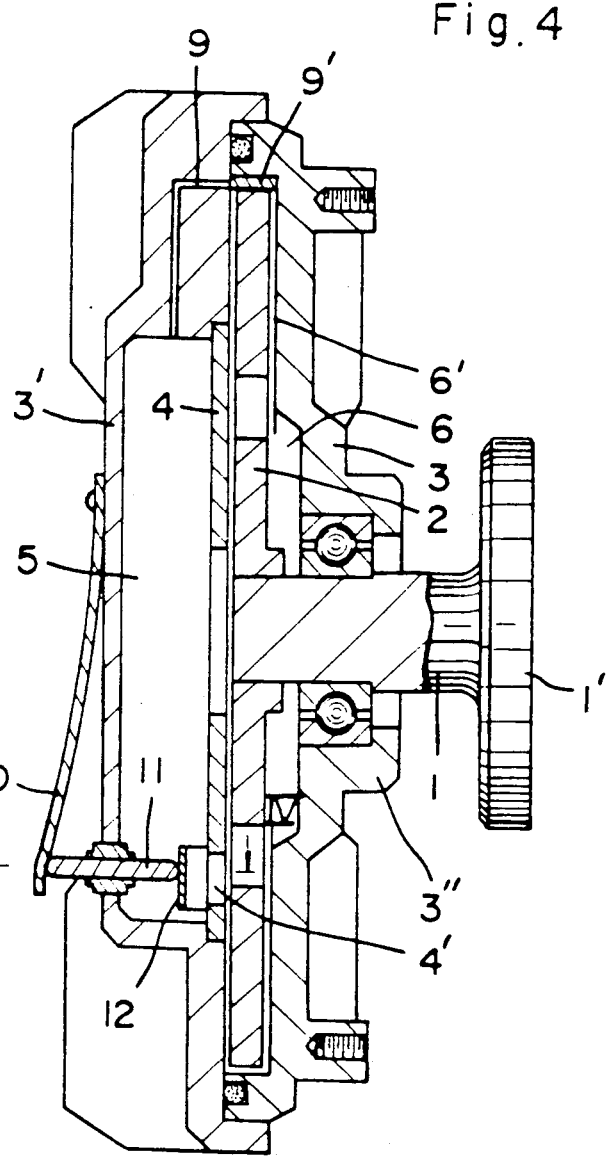
FIG. 4 is a cross section similar to FIG. 1, but showing another fan fluid coupling according to the invention.
Figure 4B:
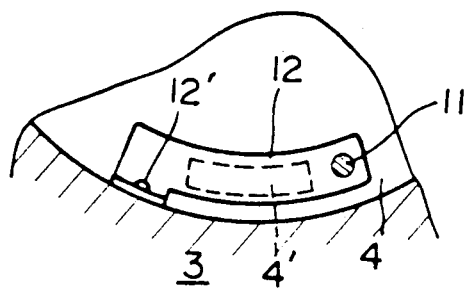
FIG. 4B is a sectional view of another embodiment of the invention.
Figure 4A:
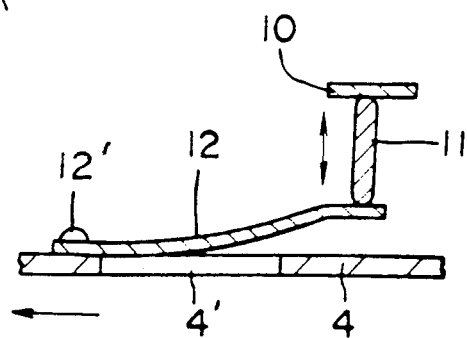
FIG. 4A is a cross-sectional view taken on line 4A—4A of FIG. 4.

In FIGS. 3 and 4A, the solid arrows indicate the direction in which the interlocking member 8 and the rod member 11 move.

As described thus far, in the novel temperature-controlled fan fluid coupling, the outflow-adjusting hole 4' is continuously and accurately closed always in response to wide ambient temperature variations while the automobile is running, by the short tonguelike valve member 12 which is curved upward about the fixed location 12', near the outer end of the coupling at which oil is under the highest pressure by the centrifugal force during rotation, because of the position of the hole 4', its large area, and the shape of the slot extending circumferentially. In this way, the amount of oil flowing into the torque transmission chamber 6 is precisely controlled. Hence, appropriate amount of cooling air is obtained over a wide temperature range always according to the operating conditions of the engine. Consequently, the fan coupling responds well to temperature variations. Further, the coupling controls the amount of delivered oil quickly, smoothly, and accurately. Additionally, if the valve member deflects back and forth when the amount of oil flowing through the outflow-adjusting hole varies, hunting can be prevented. Also, if the oil pressure is high near the outer periphery, the valve member is not hindered from closing the hole. At the same time, torque can be transmitted effectively, because oil which contains less air bubbles near the outer periphery flows out toward the torque transmission chamber 6. Furthermore, at the time of start-up or acceleration of the engine, rapid increase in the rotational speed of the fan can be prevented. Thus, a quite useful temperature-controlled fan fluid coupling is offered.

What is claimed is:

1. A temperature-controlled fan fluid coupling comprising:
   a rotating shaft having opposed front and rear ends;
   a drive disk rigidly fixed to the front end of the shaft and having a outer circumferential surface;
   a sealed housing comprising a cover and a casing defining an inside therebetween, said housing being supported on the shaft via a bearing such that the drive disk is on the inside of the housing;
   a generally circular partition plate which partitions the inside of the housing into an oil reservoir chamber and a torque transmission chamber containing the drive disk, the partition plate having an outer circumference and having an outflow-adjusting hole that adjusts the outflow of oil between the oil reservoir chamber and the torque transmission chamber, the hole being located close to the outer circumference of the partition plate, the hole taking the form of a slot having an elongated direction extending circumferentially of the partition plate;
   a dam formed in a part of the inner wall surface of the housing which is opposite to the outer wall surface of the drive disk and on which oil collects during rotation;
   a circulating passage communicating with the dam and extending from the torque transmission chamber to the oil reservoir chamber;
   a temperature-sensing member that is mounted on the housing and deforms with temperature;
   an elongated tonguelike resilient valve member having an elongated direction extending circumferentially of the partition plate and interlocking with the deforming temperature-sensing member for opening the outflow-adjusting hole when ambient temperature exceeds a preset value and for closing the outflow-adjusting hole when ambient temperature is below the preset value, the valve member being curved upward away from the partition plate, the valve member being located close to the outflow-adjusting hole and extending over the hole, one end of the valve member being rigidly fixed in the oil reservoir chamber;
   a gap formed between opposite surfaces of the drive disk, the casing, and the cover near the outer circumferential surface of the drive disk to transmit torque;
   and wherein the effective contact area of oil in the gap is increased and decreased to control the torque transmitted from the rotating shaft to the sealed housing.

2. The fan fluid coupling of claim 1, wherein a rod member is interposed between the temperature-sensing member and the curved valve member.

3. The fan fluid coupling of claim 1, wherein the valve member is fixed to the partition plate upstream of the outflow-adjusting hole as viewed in the direction of rotation.

4. The fan fluid coupling of claim 1 further comprising a rod member slidably mounted in the housing and extending from the temperature-sensing member into the oil reservoir chamber, an interlocking member rigidly mounted to a portion of the partition plate in the oil reservoir chamber and having a first portion in contact with the valve member and a second portion in contact with the rod member such that deformation of the temperature-sensing member is transmitted to the valve member through the rod member and the interlocking member.

5. The fan fluid coupling of claim 4, wherein a weight is attached to the interlocking member.

* * * * *